United States Patent [19]

Granda

[11] 4,199,199
[45] Apr. 22, 1980

[54] CARTRIDGE-TYPE PIVOTAL PIN AND BUSHING JOINT

[76] Inventor: Gerald L. Granda, 822 S. Feldkamp Ave., Springfield, Ill. 62704

[21] Appl. No.: 942,053

[22] Filed: Sep. 13, 1978

[51] Int. Cl.² .................. B62D 55/20; F16G 13/08
[52] U.S. Cl. .................................. 305/11; 305/14; 305/58 R; 74/251 R; 74/255 R; 277/95; 308/36.1; 308/135; 308/238
[58] Field of Search ............ 305/11, 58 R, 14, 59; 308/135, 36.1, 36.5, 37, 238, DIG. 7, DIG. 8; 74/251 R, 255 R, 255 S; 277/96.2, 96, 95, 94, 92; 403/150–151; 414/634

[56] References Cited

U.S. PATENT DOCUMENTS

| | | | |
|---|---|---|---|
| 2,816,453 | 12/1957 | Frank et al. | 74/251 R |
| 3,948,574 | 4/1976 | Baylor | 305/59 X |
| 4,095,909 | 6/1978 | Mackoway | 74/251 R X |

*Primary Examiner*—Charles A. Marmor
*Attorney, Agent, or Firm*—Neuman, Williams, Anderson & Olson

[57] ABSTRACT

This improved cartridge-type pivotal pin and bushing joint comprises a cylindrical pin having a large, hollow metal cylinder concentrically disposed thereon intermediate the extremities thereof and a plurality of preloaded, spaced, dry, self-lubricated cylindrical bushings between the pin and cylinder at least adjacent the extremities of the cylinder. Dry, self-lubricated annular thrust bearings are concentrically mounted on the pin adjacent the extremities of the cylinder and thrust-controlling annular retainers are immovably press-fitted on the pin axially exterior to and abutting the thrust bearings so as to compressibly preload the same. The retainers have rounded or chamfered edges to facilitate press-fitting and seal-receiving annular grooves radially outwardly of the outer radial extremity of the thrust bearings, the open end of each of the grooves being disposed towards the end of the cylinder. Resilient seals are disposed in the grooves to sealingly engaged end portions of the cylinder. The self-lubricated cylindrical bushings may be metal-backed and the retainers may be manufactured with wall portions forming a primary seal.

12 Claims, 7 Drawing Figures

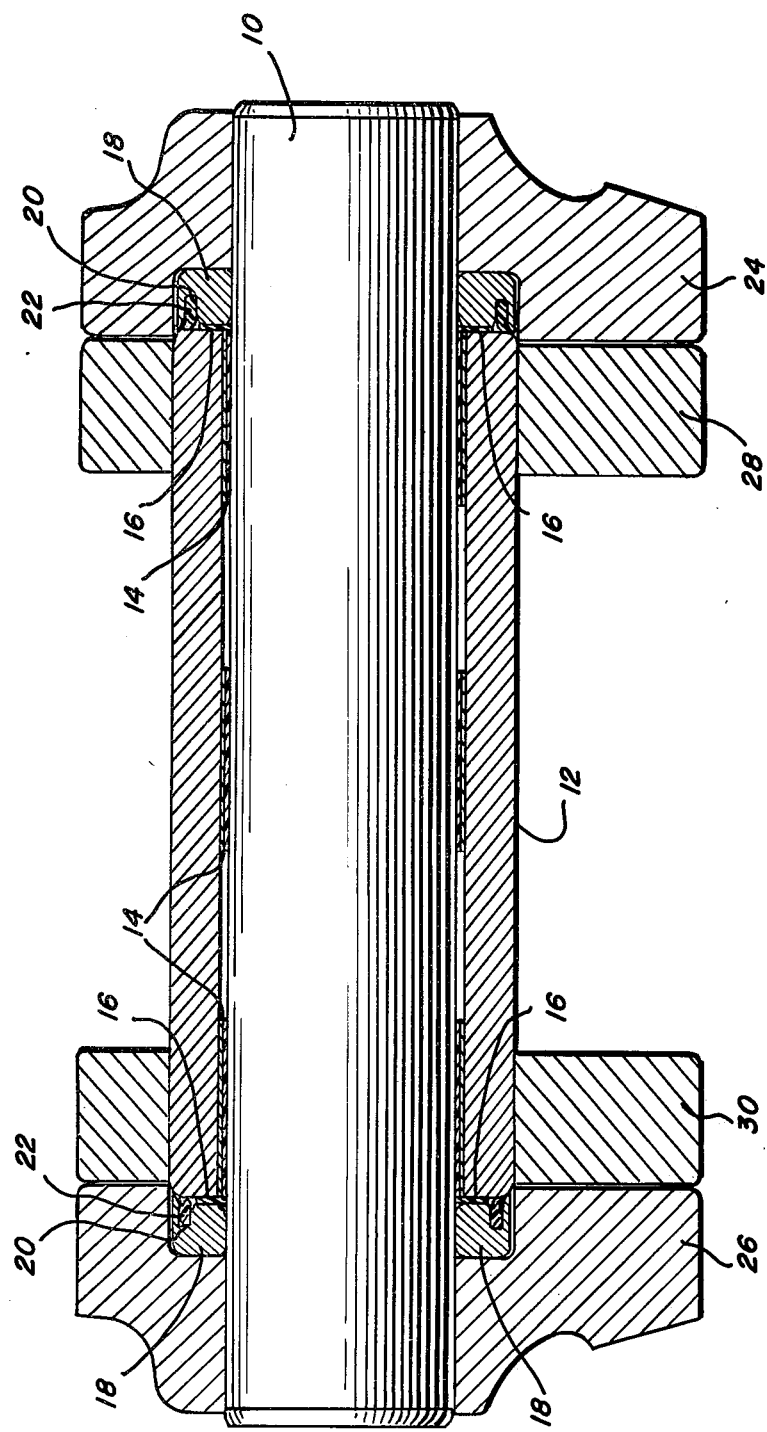

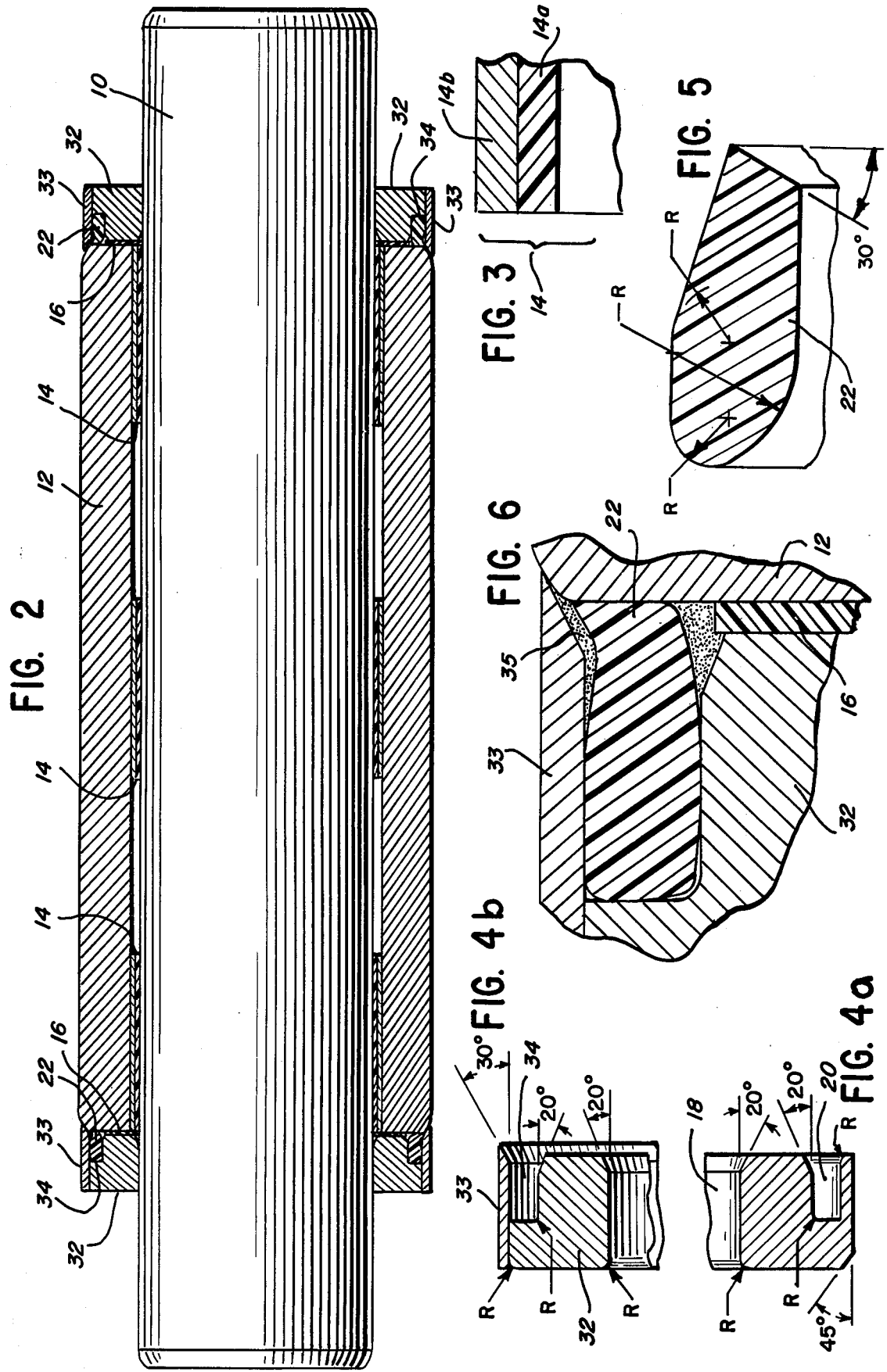

CARTRIDGE-TYPE PIVOTAL PIN AND BUSHING JOINT

BACKGROUND OF THE INVENTION

This invention is the subject matter of Disclosure Document 070810, filed in the U.S. Patent and Trademark Office on behalf of applicant on May 1, 1978.

1. Field of the Invention

This invention relates to an improved pivotal pin and bushing joint which may be advantageously employed in a variety of hinged apparatuses, such as, for example, the endless track chain of crawler tractors, the articulated joints of lift and tilt mechanisms of loaders, and the like. More specifically, it relates to a unique cartridge-type pivotal pin and bushing joint which provides enhanced performance and more adequately copes with certain problems associated with prior art structures, particularly sealing problems.

While the present invention is described herein with reference to a particular embodiment advantageously employed in the endless track of tractors, it should be understood that the invention is not limited thereto. The cartridge-type pivotal pin and bushing joint of the present invention may be employed in a variety of forms and may be used in a variety of hinged assemblies as those skilled in the art will recognize in the light of the present disclosure.

2. Description of the Prior Art

Pivotal pin and bushing joints of the general type contemplated herein are well known in the prior art, and the seriousness of the problems associated therewith have been long recognized and have been the subject of much developmental activity. This activity is reflected in the patent art, representative patents including, for example, U.S. Pat. Nos. 2,906,562 to Burgman; 2,911,840 to Muller et al.; 3,244,457 to Ross; 3,336,089 to Krickler; 3,347,602 to Rixmann et al; 3,463,560 and 3,554,588 to Reinsma et al.; 3,574,419 to Hatch; 3,595,572 to applicant herein; 3,675,936 to Hatch; 3,680,924 to Otto et al.; 3,731,551 to Nelson; 3,759,586 to Otto et al.; 3,841,718 to Reinsma; 3,948,574 to Baylor; 3,958,836 to Brown; 3,975,028 to Satsumabayashi et al.; 3,985,366 to Plouzek; 4,007,972 to Baylor; and 4,030,730 to Maguire. The present invention is directed to improvements in such joints.

Modern-day hinged apparatuses, particularly heavy duty machines used in building and highway construction, have articulated or hinged joints which are subjected to heavy loading under extremely adverse operating conditions. The heavy loading includes operations under load on slanted surfaces and turning operations, which subject the joints to a variety of forces in various directions, including longitudinal thrust forces. The lubrication of these joints is complicated by the extremely adverse operating conditions, including widely-variable weather and temperature conditions and the inevitable presence of dirt, sand, rocks and other abrasive materials in contact with the joints and bearing surfaces under severe loading. Accordingly, it is essential that the joints be adequately lubricated and protected from abrasion by simple, reliable, effective and economic sealing means under all conditions of operation. Moreover, inasmuch as the joints are often stored for considerable periods under adverse conditions prior to installation, particularly in the field, the bearing surfaces should be sealed against rust or corrosion producing ambient conditions and the like.

The prior art solutions thereto, such as disclosed in the aforementioned patents, suffer from one or more shortcomings which limit their usefulness or effectiveness or render them problem-prone or costly. Some are inadequately lubricated or poorly sealed and fail after relatively short periods. But even it adequately lubricated, the loss of lubricant or the cost of preventing or making up for such loss make for an unsatisfactory situation. The undesired intermixing of lubricant and abrasives can cause more wear than no lubricant at all. Seals to prevent lubricant loss or the entry of contaminants are often ineffective, too complex, or too costly.

The requirement for lubricant passages and entry ports increases the cost of manufacture and requires that the design or metallurgy take in consideration the associated loss of structural strength. The provision of flowable lubricants otherwise increases the complexity of the unit when manufactured and also increases the cost of installation and periodic maintenance.

Some prior art pin and bushing joints are inherently noisy and are characterized by excessive frictional losses which require greater horsepower for satisfactory operation. The need to minimize noise pollution and to otherwise meet OSHA requirements and the emphasis on energy conservation have become major considerations in modern machinery design.

But even when prior art devices may meet operating requirements, some are too costly, or inconvenient to install and maintain. Some can not be assembled without at least one split link. Some require continued monitoring of lubricants. Moreover, some have limited shelf life in the sense that bearing surfaces thereof are subject to rust and corrosion or other deterioration prior to installation. Still other designs are not versatile in the sense that they cannot readily be used to replace other joints in the field.

Some prior art joints require manufacturing steps otherwise deleterious to the joint or materials of construction. For example, some pivotal pin and bushing joints employ a welding step during manufacture or installation. The associated heat may have deleterious metallurgical effects and may otherwise harm non-metal seals and flowable lubricants or cause the loss thereof by melting or the like.

OBJECTS OF THE INVENTION

It is therefore a general object of the present invention to provide an improved cartridge-type pivotal pin and bushing joint which more adequately copes with shortcomings associated with prior art devices. It is another general object to provide a cartridge-type pivotal pin and bushing joint which is self-lubricated and adequately sealed against contamination. It is another general object to provide a sealed pivotal pin and bushing joint which is simple to manufacture, convenient to install and maintain and meets the demanding requirements in the field. It is another object to provide a pivotal pin and bushing joint design which lends itself to assembly without a split link.

It is another object to provide a pivotal pin and bushing joint which self-protects bearing surfaces against rust, corrosion and other deterioration prior to use and provides extended life during use. It is another object to provide a pivotal pin and bushing joint which is free of lubricant passages, plugs and entry ports and is otherwise free of problems associated with the loss of flowable lubricants and the like. It is another object to provide a pivotal pin and bushing joint which is self-lubricated against both rotational and end-thrust friction.

It is still another object to provide a self-lubricated pivotal pin and bushing joint which is quiet-running and features lower frictional losses and thus requires less energy during normal operations than non-lubricated prior art joints. It is another object to provide a pivotal pin and bushing joint featuring in a preferred embodiment two levels of sealing.

It is another object to provide a cartridge-type pivotal pin and bushing joint which is press-fitted and does not require any welding or other deleterious operations during manufacture, assembly or installation. It is another object to provide a versatile pin and bushing joint featuring dry self-lubricants which are adequately sealed against contamination, whereby to provide greater resistance to early failure under severe field conditions.

These and other objects will become apparent from the description hereinafter set forth.

SUMMARY OF THE INVENTION

These objects are achieved by a cartridge-type pivotal pin and bushing joint which in a particular embodiment comprises a cylindrical metal pin having a large, hollow metal cylinder concentrically disposed thereon intermediate the extremities thereof and a plurality of spaced, dry, self-lubricated cylindrical bushings between the pin and cylinder at least adjacent the extremities of the cylinder. The bushings are radially compressively preloaded sufficiently to reduce compressive set under functional loading but still permitting at least limited relative rotational or oscillatory movement of the pin with respect to the cylinder under such functional loading.

Dry, self-lubricated annular thrust bearings are substantially concentrically mounted on the pin axially exterior to and adjacent the extremities of the cylinder, and thrust-controlling annular retainers are immovably press-fitted on the pin axially exterior to and abutting the thrust bearings so as to compressibly preload (at least when first assembled) the thrust bearings against at least a radially-inner portion of the ends of the cylinder. The retainers also have seal-receiving annular grooves or pockets radially outwardly of the outer radial extremity of the thrust bearings, the open end of each of the grooves being disposed toward the end of the cylinder. Resilient sealing means are disposed in the grooves and sealingly engaged end portions of the cylinder throughout the normal range of relative axial movement thereof under functional loading.

In a specific embodiment, the pin and cylinder are hardened steel. The retainers may also be hardened steel but optionally may be cold rolled steel, e.g., AISI 1018 cold rolled. The bushings and thrust bearings comprise Teflon (trademark of E. I. du Pont de Nemours & Co. for a plastic consisting of tetrafluoroethylene polymer); and the resilient sealing means comprise elastomeric polyurethane. The self-lubricated cylindrical bushings may be metal-backed by conforming steel cylinders or equivalent. The retainers are preferably manufactured in at least two pieces, e.g., a steel metal inner body and a peripherally-disposed, relatively-soft metallic outer portion, e.g., copper, bronze, or the like, extending axially towards and conforming to the outer end portion of the hollow cylinder so as to form a primary seal with respect thereto.

The materials of construction per se are not part of the inventive concept herein and depend upon the usage to which the present invention is to be subjected. Materials having similar or equivalent functional properties may be substituted. They will be apparent to those skilled in the art of pivotal pin and bushing joints in the light of the present disclosure.

A suitable grease, e.g., a "double-ought" lithium base grease, may be employed in the grooves or pockets whereby to assist in the insertion of the resilient sealing means therein, to fill or pack all void spaces and to lubricate. It is believed that oil from the grease may be absorbed into the elastomeric polyurethane sealing means, thereby to enhance the lubricity thereof.

To facilitate the press-fit assembly of the retainers on the pin, the inner leading and trailing extremities thereof should have a larger diameter than the intermediate portion. This is readily accomplished by chamfering, rounding or otherwise curving these extremities. Other edges may be similarly rounded or chamfered to facilitate manufacture or for design integrity or convenience.

Since the assembled cartridge forms a sealed unit, it is substantially impervious to contaminants, rust, corrosion or other deterioration, thereby enhancing shelf life. To insure such enhanced shelf life, the components making up the cartridge should be clean and assembled under substantially clean conditions.

BRIEF DESCRIPTION OF THE DRAWINGS

The present invention may be more clearly understood from the following detailed description of specific and preferred embodiments read in conjunction with the accompanying drawings wherein:

FIG. 1 is a partial sectional plan view of an embodiment of the cartridge-type pivotal pin and bushing joint of the present invention installed so as to connect two links of an endless track chain of a crawler tractor;

FIG. 2 is a partial sectional view on a larger scale than FIG. 1 of another embodiment of the improved pivotal pin and bushing joint of the present invention prior to installation;

FIG. 3 is a fragmentary sectional view on an enlarged scale of an embodiment of one of the dry, self-lubricated cylindrical bushings such as may be employed in the pivotal pin and bushing joints of FIGS. 1 and 2;

FIGS. 4a and 4b are enlarged fragmentary sectional views of alternative embodiments of the annular retainers employed in the pivotal pin and bushing joints of FIGS. 1 and 2, respectively;

FIG. 5 is an enlarged sectional view of an embodiment of the resilient sealing means which may be advantageously employed in the seal-receiving annular pockets of the embodiments of FIGS. 4a and 4b; and FIG. 6 is a fragmentary sectional view showing the resilient sealing means of FIG. 5 disposed in the seal-receiving annular pockets of the embodiment depicted in FIGS. 3 and 4b.

It should be understood that the drawings are not necessarily to scale and that certain aspects of the depicted embodiments may be illustrated by graphic symbols, diagrammatic representations and fragmentary and cut-away views for ease of understanding. In certain instances, mechanical details which are not necessary for an understanding of the present invention or which render other details difficult to perceive, may have been omitted or symbolically represented.

It should also be understood, of course, that the invention is not necessarily limited to the particular embodiments illustrated herein, although the embodiment of FIG. 2 depicts the best mode presently contemplated for carrying out the invention.

DETAILED DESCRIPTION OF THE DRAWINGS

Referring to FIG. 1, the cartridge-type pivotal pin and bushing joint comprises pivotal pin 10, hollow metal cylinder 12 concentrically disposed on pin 10 intermediate the extremities thereof, and a plurality of spaced, dry, self-lubricated cylindrical bushings 14 concentrically disposed between pin 10 and cylinder 12. Bushings 14 are tightly fitted between pin 10 and cylinder 12 and are compressively preloaded sufficiently to reduce compression set under functional loading but still permitting at least limited relative rotational or oscillatory movement of pin 10 and cylinder 12. Dry, self-lubricated annular thrust bearings 16 are concentrically mounted on pin 10 adjacent the extremities of cylinder 12 and are compressively preloaded against at least a radially-inner portion of the ends of cylinder 12 by means of thrust-controlling annular retainers 18 which are immovably press-fitted on pin 10.

The degree of preloading of bushings 14 and annular thrust bearings 16 depends upon a variety of factors, including materials of construction, geometry, type and amount of loading and the like. Such preloading is best determined empirically for each type of application.

The inside diameter of thrust bearing 16 may be larger than the outer diameter of pin 10 or even larger than the inner diameter of cylinder 12 to allow for deformation under compressive forces, to save material and to facilitate assembly.

Annular retainers 18 have seal-receiving annular grooves or pockets 20 in which resilient sealing means 22 are disposed so as to sealingly engage the end portions of cylinder 12 throughout the normal range of relative axial and oscillatory movement under the functional loading to which it is subjected. Grease is also packed therein and enhances both the sealing and lubrication functions.

The pivotal pin and bushing joint of FIG. 1 is employed to join tractor links 24 and 26 to adjacent links 28 and 30, respectively. Links 24 and 26 oscillate relative to links 28 and 30 as the chain passes around the sprocket of the tractor. While three bushings 14 are depicted in FIG. 1, it is contemplated that only the outer two may be necessary, depending upon the loading, geometry and related factors.

The cartridge-type pivotal pin and bushing joint of FIG. 2 is the same as that of FIG. 1 except that the unitary annular retainers 18 of FIG. 1 are replaced by the preferred two-piece embodiment comprising metallic inner body 32 and vertically-disposed, relatively-soft metallic outer portion 33. As will be apparent from FIG. 4b (to be discussed hereinafter), outer portion 33 may be axially extended towards cylinder 12 and conformed to the contacting surface thereof so as to form a primary seal against dirt, grit and the like. The inner surface of outer portion 33 also serves as the outer wall of seal-receiving pocket 34.

Referring to FIG. 3, the preferred embodiment of a self-lubricated cylindrical bushing 14 comprises Teflon polymer inner cylinder 14a which is backed by metallic outer cylinder 14b, which may be steel or other suitable supporting metal. As aforementioned, bushing 14 is compressively preloaded between pin 10 and cylinder 12 sufficiently to reduce compression set under the functional loading to which the joint is subjected but still permitting at least limited relative rotational movement of pin 10 with respect to cylinder 12 under such functional loading.

Referring to FIG. 4a, the thrust-controlling annular retainer 18 includes pocket 20 for the resilient sealing means. It may be machined from steel, molded from powdered metal or otherwise fabricated. Because it is press-fitted on pin 10, the inner corners are chamfered or rounded, as suggested by the 20° angle and the "R" on the inner diameter of FIG. 4a. This will facilitate the press-fitting operation with a minimum of galling, metal scoring, and the like. As will be apparent to those skilled in the metalforming and assembly fields, press-fitting problems are minimized by appropriate use of lubricants, e.g., water, oil, grease, or the like, particularly those which will evaporate or otherwise will not decrease the holding power of the press-fit. In a specific embodiment, materials may also be employed to both lubricate and augment the metal-to-metal gripping power inherent in a press-fit, e.g., Loctite preparations (Loctite Corporation, Newington, Connecticut). Other corners and edges may be chamfered and rounded, as indicated in FIG. 4a, for convenience, ease of manufacture and the like.

In the two-piece embodiment of FIG. 4b, the metallic inner body 32 may be more readily and less expensively machined with less likelihood of undue breakage than the embodiment of FIG. 4a. Thus, seal-receiving pocket 34 is formed by machining a step or shoulder in the outer periphery of inner body 32 and forming the outer wall of the pocket by means of a peripherally-disposed, relatively soft metallic outer ring 33, which may be press-fitted in place. This provides the additional flexibility of being able to readily vary the axial length of the outer ring as compared with the axial length of the inner body. Again, the inner corners are chamfered or rounded to facilitate a press-fitting operation and for manufacturing convenience.

As will be apparent from the discussion of FIG. 6 hereinafter, outer ring 33 provides a means of forming a primary seal. It should be recognized, however, that the unitary or single-piece embodiment of FIG. 4a may also be designed to provide the same type of primary seal, albeit at a somewhat higher cost, particularly if machined. Increased breakage problems during machining, which would be associated with a one-piece structure shaped like that of the two-piece design of FIG. 4b, could be avoided by molding the more complex structure from suitable powdered metals.

Referring to FIG. 5, the resilient sealing means may comprise any suitable elastomeric material having the wear characteristics necessary for the type of service to be encountered. While a variety of configurations may be employed, a particularly advantageous configuration for seal 22 is that depicted in FIG. 5. Manifestly, the sealing means must be resilient and have the wear properties consistent with the severe service to which the joint will be subjected. In a preferred embodiment, as aforementioned, the resilient sealing means comprises elastomeric polyurethane.

FIG. 6 depicts sealing means 22 in its compressed disposition in the pocket of the two-piece version of the retainer. The portion of sealing means 22 adjacent the surface thereof which is in sealing contact with the end wall of cylinder 12 is sufficiently flexed so that the surface stays in sealing contact with cylinder 12 despite normal relative axial movement and wear. Thus the elastomeric seal formed thereby provides the main protection in the event that the primary seal fails or is inadequate.

FIG. 6 also more clearly illustrates how outer ring 33 forms the aforesaid primary seal with the adjacent surface of cylinder 12. In practice, it is preferred that ring 33 be in actual contact with the cylinder, thereby forming a wear fit during operation.

As aforementioned, void space in the pocket, particularly between the primary and secondary seals, is packed with a suitable lubricating grease 35. This enhances the sealing effect, in part by forming another barrier against dust and other contaminants which intrude past the primary seal. It also provides lubrication.

FIG. 6 also depicts the disposition and relationship of the dry, self-lubricated annular thrust bearings 16. These thrust bearings are preferably preloaded, at least when initially assembled so as to minimize any play or looseness as working forces cause relative movement or wear takes place. In a preferred embodiment, thrust bearings 16 comprise Teflon, a preferred form being the KTN Series of self-lubricated thrust bearings sold commercially under the trademark KAHR-LON by Kahr Bearing Division of Sargent Industries, Burbank, California. These thrust bearings are in effect non-metallic washers which incorporate self-lubricating surfaces on both faces, e.g., Teflon, backed by high strength reinforced phenolic.

From the above detailed description, it will be apparent to those skilled in the art that the objects of the invention have been achieved. While only certain embodiments have been set forth, alternative embodiments and various modifications will be apparent from the above description to those skilled in the art. These and other alternatives are considered equivalents and within the scope and spirit of the present invention.

Having described the invention, what is claimed is:

1. A cartridge-type pivotal pin and bushing joint comprising in combination:
   a. a cylindrical pin;
   b. a large, hollow metal cylinder concentrically disposed on said pin intermediate the extremities thereof;
   c. a plurality of spaced, dry, self-lubricated cylindrical bushings between said pin and said cylinder at least adjacent the extremities of said cylinder, said bushings being radially compressively preloaded sufficiently to reduce compression set under functional loading of the joint but still permitting at least limited relative rotational movement of said pin with respect to said cylinder under said functional loading;
   d. dry, self-lubricated annular thrust bearings substantially concentrically mounted on said pin adjacent the extremities of said cylinder;
   e. thrust-controlling annular retainers immovably press-fitted on said pin axially exterior to and abutting said thrust bearings so as to compressively preload said thrust bearings against at least a radially-inner portion of the ends of said cylinder, said retainers having seal-receiving annular grooves radially outwardly of the outer radial extremity of said thrust bearings, the open end of each of said grooves being disposed towards the ends of said cylinder; and
   f. resilient sealing means disposed in said grooves and sealingly engaging end portions of said cylinder throughout the normal range of relative axial and oscillatory movement thereof under said functional loading.

2. The joint of claim 1 wherein each of said spaced, dry, self-lubricated cylindrical bushings comprises a polytetrafluoroethylene-containing matrix supported on a cylindrical metal backing.

3. The joint of claim 1 wherein one of said plurality of spaced, dry, self-lubricated cylindrical bearings is centrally-axially disposed.

4. The joint of claim 1 wherein each of said annular retainers comprises a metallic inner body and a peripherally-disposed, relatively-soft metallic outer portion extending axially toward the outer end portion of the hollow cylinder so as to form a primary seal.

5. The joint of claim 4 wherein said seal-receiving annular grooves are disposed adjacent the outer radial margin of said annular retainers and said relatively-soft metallic outer portion forms the outer radial extremity of said seal-receiving annular grooves.

6. The joint of claim 1 wherein said dry, self-lubricated annular thrust bearings comprise polytetrafluoroethylene-faced reinforced phenolic washers.

7. The joint of claim 1 wherein said resilient sealing means comprises an elastomeric polyurethane annular member compressively disposed in said grooves.

8. The joint of claim 1 wherein said pin, said cylinder and said retainers comprise steel; said bushings and said thrust bearings comprise polytetrafluoroethylene; and said resilient sealing means comprises elastomeric polyurethane.

9. The joint of claim 1 wherein the leading and trailing inner extremities of said annular retainers have larger diameters than the intermediate portion to facilitate the press-fit assembly of said retainers on said pin.

10. The joint of claim 1 wherein the leading and trailing inner extremities of said annular retainers are chamfered to facilitate the press-fit assembly of said retainers on said pin.

11. The joint of claim 1 wherein the leading and trailing inner extremities of said annular retainers are radiused to facilitate the press-fit assembly of said retainers on said pin.

12. The joint of claim 1 wherein void space in said grooves is packed with a lubricating grease.

* * * * *